Sept. 28, 1926.

J. W. PLAMONDON 1,601,602

DIRIGIBLE HEADLIGHT FOR AUTOMOBILES

Filed August 17, 1925  2 Sheets-Sheet 1

Inventor
Joseph W. Plamondon
By Sturtevant & Mason
Attorneys.

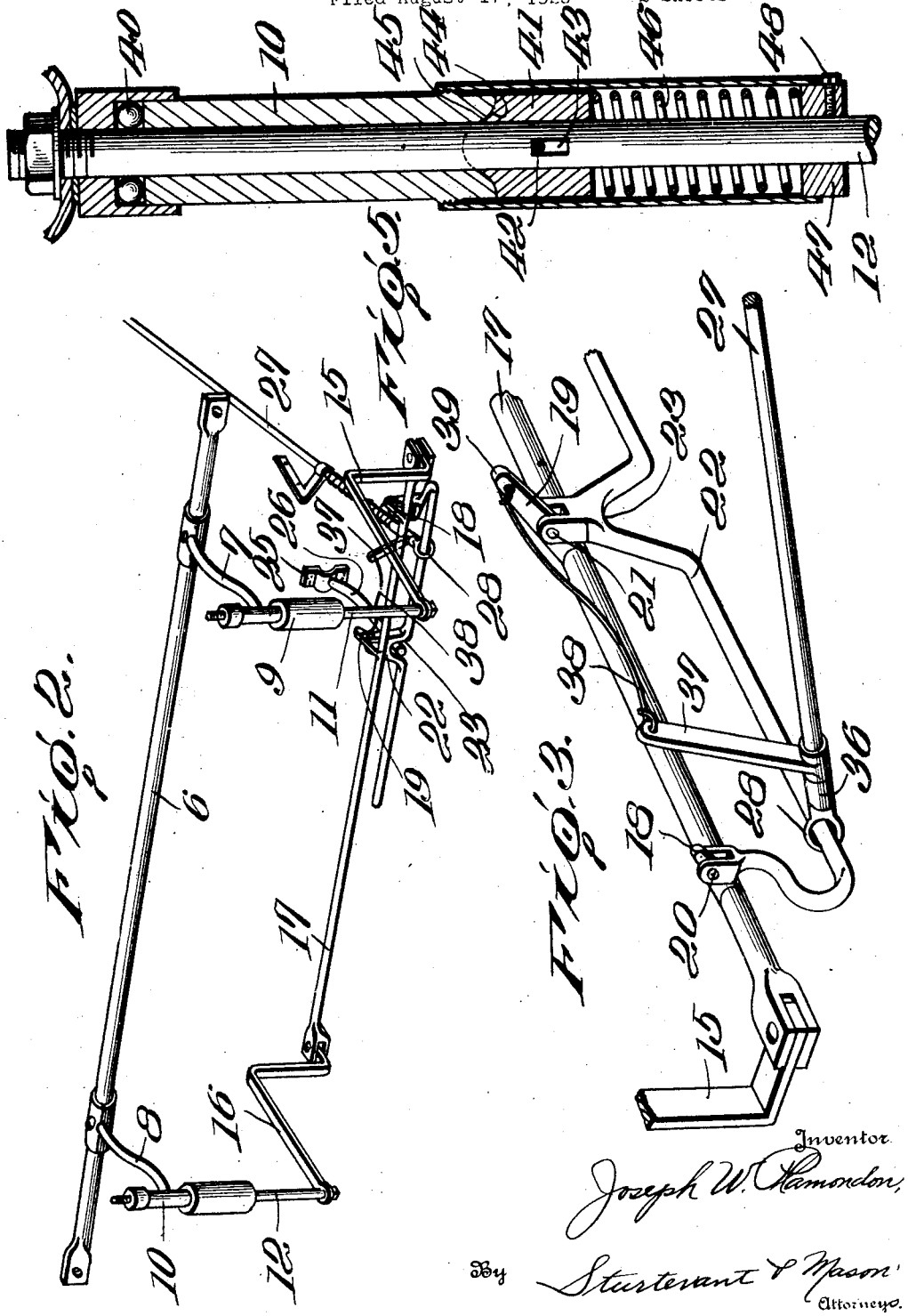

Patented Sept. 28, 1926.

1,601,602

UNITED STATES PATENT OFFICE.

JOSEPH WILFRID PLAMONDON, OF STE. MADELEINE, QUEBEC, CANADA, ASSIGNOR OF ONE-HALF TO JOSEPH N. PAUL FOURNIER, OF ST. HYACINTHE, CANADA.

DIRIGIBLE HEADLIGHT FOR AUTOMOBILES.

Application filed August 17, 1925. Serial No. 50,723.

My invention relates to improvements in dirigible head lights for automobiles.

The object of my invention is to provide a dirigible head light for automobiles which is controlled through the steering gear connecting rod of an automobile so that the lights will turn when the automobile turns, and maintain the rays of light on the road directly ahead of the automobile.

Another object of my invention is to provide a dirigible head light of this character which is provided with means operated on the steering column, whereby the lights can be disconnected from the steering gear connecting rod, whereby the lights will not be operated by the turning of the machine which is preferably used in the day when the lights are not necessary.

A further object of my invention is to provide a head light having the above mentioned objects and having in combination therewith means whereby the controlling means on the steering column can turn the lights to the right so that the light will shine on the side of the road when meeting a car.

A still further object of my invention is to provide a simple, cheap and effective dirigible head light of this character having certain details of structure and combination of parts hereinafter more fully set forth;

In the accompanying drawings:—

Figure 1 is a plan view of the forward end of an automobile in dotted lines, showing my improved attachment applied thereto.

Figure 2 is a front perspective view of the complete attachment with the head lights removed.

Figure 3 is a rear enlarged perspective view of the right hand end of Figure 2.

Figure 4 is a perspective view of the upper end of the control lever carried by the steering column near the steering wheel.

Figure 5 is an enlarged perspective sectional view of one of the lamp supports showing means for returning the lamp so that it is maintained in the position to throw the light directly ahead of the machine.

Referring now to the drawings, 1 represents the chassis of the machine and 2 the front wheels having their steering knuckles 3 and 4 connected by the usual rod 5, whereby the wheels are moved together, as is understood, and of the usual construction. Extending across the front of the machine and connected to the forward mudguards is a bar 6 having rigidly connected thereto the brackets 7 and 8 which are adapted to support a housing 9 and 10, through which the lamp supporting rods 11 and 12 are rotatably mounted. The lamps 13 and 14 are rigidly carried by the rotatable rods 11 and 12, and rigidly carried by the lower ends of the rods 11 and 12 are the L-shaped brackets 15 and 16 having their inner ends turned laterally and connected together by the bar 17.

The bar 17 is provided with the two outwardly extending rigid ears 18 and 19 to which is pivoted at 21 the yoke 22, the yoke having the U-shaped portion 23 arranged opposite the ear 19. Connected to the steering connecting rod is the rod 24 which extends upwardly, and operatively connected with the steering shaft, all of which is well understood and needs no further description.

Rigidly carried by this rod is a sleeve 25 which has an arm 26 connected thereto, and which extends within the U shaped portion 23 of the yoke 22, and whereby the movement of the rod 24 is imparted to the rod 17 through the yoke, and the rod 17 in turn oscillates the head light supporting rods 11 and 12, whereby the head lights are oscillated to turn with the turning of the car, whereby the lights will at all times be maintained on the road directly ahead of the machine.

In order to disconnect the head lights from the steering connecting rod 24, I provide the rod 27 which has at its lower end an eye 28 through which the yoke 22 passes. The upper end of the rod 27 is rotatably mounted within the sleeve 29 carried by the bracket 30, clamped by means of the clamp 31 to the steering column. Carried by the brackets 30 is an upwardly extending arm 33 which has the rearwardly inclined face 34 adapted to engage the lower face of the laterally turned end 35 of the rod 27. The eye 28, carried by the lower end of the rod 27, has a loose connection 36, whereby the rod can be turned independent of the eye, yet longitudinally movable therewith.

When the laterally turned end 35 of the rod 27 is turned and has traveled up the incline 34, the rod 27 has been drawn upwardly swinging the yoke 22 on the pivots 20 and 21 so that said yoke is out of the path of travel of the arm 26, and thus the head lights are brought into a neutral position so that the steering of the machine in no way affects the lamps. By turning the laterally turned end 35 in the opposite direction the yoke is turned downwardly so that the U shaped portion 23 straddles the arm 26, and the head lights will then move with the steering of the machine.

In order to provide means whereby the lights may be turned to the right to shine on the side of the road when meeting a car, I have provided the rod 27 with a rigid arm 37, which has connected thereto a flexible cable 38, the opposite end of which is connected to the extension 39 of the ear 19. The continued movement of the laterally turned end 35 of the rod 27 to the point C, will cause the cable to tighten and move the rod 17 to the left, Figure 1, and throw the lights to the right, independent of the turning of the car. It is, of course, understood that when the laterally turned end 35 of the lever is at the point A it is disengaging the yoke from the arm 26, thus the continued movement of the laterally turned end 35 causes the head lights to swing slightly to the right and shine on the side of the road.

In Figure 5 of the drawings the rod 12 passes through the housing 10, and has a ball bearing connection 40 with said housing. The rod 12 within the housing 10 is provided with a sleeve 41 held thereon against rotation by means of pin 42 working in slots 43, and whereby the sleeve 41 is held against rotation on the rod but free to have a limited longitudinal movement thereon. The upper end of the sleeve 41 has a cam face 44 operating against the correspondingly shaped face 45, carried by the housing 10. Within the housing is a coil spring 46 which bears against the sleeve 41 and normally holds the cam face thereof in a registering position with the cam of the housing. The lower end of the coil spring 46 bears against a collar 47, held on the rod 12 by the set screw 48. By this structure it will be seen that when the rod 12 is turned through the mechanism, herebefore described, the collar 41 turns with the rod, and the cam face causes it to move downwardly thereon against the tension of the spring, thus it will be seen that the cam face has the tendency to return the rod 12 to its normal position, and thus when the yoke 22 is disengaged from the arm 26 the rod 17 is free and the rods 11 and 12 will assume the position shown in Figure 5 of the drawings, and the head lights will be directing their rays of light directly ahead of the car. Both of the casings 9 and 10 are constructed exactly alike, and thus the two springs in the casing are exerting the same force in the same direction to turn the lights to their position so that they are directing their rays directly ahead of the car.

These springs with the casings 9 and 10 return the lights to the position herebefore described, and should the operator turn the laterally turned lever 35 to disengage the lights when the car is making a turn, these springs will also turn the lights to this position when the lights have been moved to throw the lights to one side of the road through the arm 33, and the cable 38, as the lights, by this mechanism, are moved against the tension of the spring on the cam surface, and the moment this operating force is released the head lights return to their normal position.

Having thus fully described my invention what I claim is:

1. A dirigible headlight comprising a frame, headlights normally spring held in said frame to throw their lights directly ahead of the car, means operated by the steering gear for moving said headlights in the direction of the turning of the car, means for connecting and disconnecting said means from the steering mechanism, and means operated by the disconnecting means for turning the headlights independent of the steering mechanism.

2. A dirigible headlight comprising a frame, headlights pivotally mounted thereon, means for moving the headlights simultaneously in either direction by the steering gear of the car, means for disconnecting said means from the steering gear of the car, and means operated by a continued movement of the disconnecting means for moving the lights in one direction.

3. A dirigible headlight comprising a frame, headlights pivotally mounted thereon, means connected with the steering gear of the car for simultaneously moving the lights in either direction, a movable member operated from a point adjacent the steering wheel for disconnecting said means from the steering gear of the car, and means operated by a continued movement of said movable member for moving the headlights to the right.

4. A dirigible headlight comprising a frame, headlights pivotally mounted thereon, means for connecting the headlights with the steering gear of the car and simultaneously moving them in either direction, a mechanism for disconnecting said headlights from the steering gear, a lever for operating said mechanism, and means operated by a continued movement of the lever for moving the headlights to the right.

5. A dirigible headlight comprising a frame, headlights pivotally mounted thereon, a rod connecting the pivots of the headlights for moving the lights simultaneously in either direction, a pivoted yoke carried by said rod, an arm carried by the steering gear and adapted to enter said yoke for moving the headlights with the steering gear, and means for moving said yoke away from the arm to disconnect the arm therefrom.

6. A dirigible head light comprising a frame, head lights pivotally mounted thereon, a rod connecting the pivots of the head lights for moving the lights simultaneously in either direction, a pivoted yoke carried by said rod, an arm carried by the steering gear connecting rod and adapted to engage said yoke for moving the head lights with the steering gear connecting rod, a lever adapted to move said yoke away from the arm to disconnect the lights therefrom, and means carried by said lever for moving the connecting rod of the lights in one direction for throwing the rays of light on the side of the road.

7. A dirigible head light comprising a frame, head lights pivotally mounted thereon, a rod connecting the pivots of the head lights for simultaneously moving the lights in either direction, a yoke pivotally carried by said rod and having a fork portion, an arm carried by the steering gear connecting rod and entering the fork portion of the yoke, a lever carried by the steering column and adapted to swing the yoke on its pivot to disengage the fork portion from the arm carried by the steering gear connecting rod, an arm rigidly carried by said lever, and having a cable connection with the rod connecting the pivots of the head lights, whereby said rod can be moved independent of the steering rod when disconnected therefrom.

8. A dirigible headlight comprising a frame, headlights normally spring held in said frame to throw their light directly ahead of the car, means carried by the steering gear for moving said lights in the direction of the turning of the car, means for disconnecting said means from the steering gear, and means operated by the continued movement of the disconnecting means for turning the headlights in one direction.

9. A dirigible headlight comprising a frame, headlights pivotally mounted thereon, a yoke, an arm carried by the steering gear for interlocking with the yoke for moving the headlights in the direction of movement of the car, a lever adapted to disconnect said yoke from the steering gear, an arm carried by said lever, a cable connected to said arm, and the pivots of the headlights, whereby the movement of the lever disconnects the headlights from the steering gear, and a continued movement of the lever in the same direction moves the headlights in one direction.

In testimony whereof, I affix my signature.

JOSEPH WILFRID PLAMONDON.